(12) United States Patent
Jacobs

(10) Patent No.: US 9,362,775 B1
(45) Date of Patent: Jun. 7, 2016

(54) CHARGING WEARABLE COMPUTING DEVICES

(71) Applicant: Google Inc., Mountain View, CA (US)

(72) Inventor: Michael Kevin Jacobs, Brooklyn, NY (US)

(73) Assignee: Google Inc., Mountain View, CA (US)

( * ) Notice: Subject to any disclaimer, the term of this patent is extended or adjusted under 35 U.S.C. 154(b) by 602 days.

(21) Appl. No.: 13/783,541

(22) Filed: Mar. 4, 2013

(51) Int. Cl.
*H02J 7/00* (2006.01)
*H02J 7/02* (2016.01)

(52) U.S. Cl.
CPC ...................................... *H02J 7/025* (2013.01)

(58) Field of Classification Search
USPC .......................................................... 320/108
See application file for complete search history.

(56) References Cited

U.S. PATENT DOCUMENTS

| | | | | |
|---|---|---|---|---|
| 5,194,857 A | * | 3/1993 | Gomez | G08B 5/228 340/7.63 |
| 6,528,203 B1 | * | 3/2003 | Mitamura | H01M 2/1022 429/100 |
| 7,872,444 B2 | | 1/2011 | Hamilton et al. | |
| 2009/0322513 A1 | * | 12/2009 | Hwang | A61B 5/02055 340/539.12 |
| 2010/0315225 A1 | | 12/2010 | Teague | |
| 2012/0189146 A1 | | 7/2012 | Wuidart | |
| 2014/0159638 A1 | * | 6/2014 | Ebersold | H02J 7/0068 320/101 |

FOREIGN PATENT DOCUMENTS

WO 2011/138507 11/2011

* cited by examiner

*Primary Examiner* — Yalkew Fantu
(74) *Attorney, Agent, or Firm* — Morris & Kamlay LLP

(57) ABSTRACT

A wearable electronic device may be inductively charged during regular operation of a computing device when the electronic device is within a proximity zone of a charging component. The electronic device may be charged in a seamless manner such that the charging occurs when a user uses or operates a computing device in a regular manner. The electronic device and/or the computing device may contain an indicator that indicates a charging value for the electronic device.

21 Claims, 7 Drawing Sheets

CHARGING WEARABLE COMPUTING DEVICES

BACKGROUND

Computing devices typically are charged by connecting an electronic device to a power source, such as a power outlet or a battery pack, and leaving the device connected to the power source as it charges. It is often difficult to use a device as it is being charged because the device is constrained to a limited physical range, and a charging cable or connector may restrict user access to the device. Additionally, charging an electronic device generally requires a user to be in possession of an external charging connector, and requires the user to transport the external charging connector to one or more locations where the electronic device is to be charged. An external charging connector may be forgotten or misplaced by a user especially while transporting the connector from one location to another. Namely, the connector may be overlooked by a user as it may be used only to charge the electronic device and, thus, may not be a high priority item for a user.

BRIEF SUMMARY

According to implementations of the disclosed subject matter, a device may contain a wrist wearable display and a band configured to secure the wrist wearable display on a wrist. The device may also contain a battery and a device conductor configured to charge the battery when the battery is inductively coupled to a peripheral conductor in a computer peripheral device. The computer peripheral device may be a wrist support, a keyboard, a mouse pad, or the like and the battery may charge during regular use of the computer peripheral device.

According to implementations of the disclosed subject matter, a device may contain a regular use area which, when used by a user wearing a wearable device, causes the wearable device to be within a proximate zone of the regular use area. The device may also contain a peripheral conductor configured to induce a charge in the wearable device when the wearable device is within the proximate zone. The regular use area may be a wrist rest area for an input device such as, but not limited to, a keyboard, a mouse pad, a laptop base, or the like. The regular use area may be a portion of a mobile device such as, but not limited to, a tablet, a mobile phone, a media player, or the like.

Implementations of the disclosed subject matter may provide a device that can be charged during normal use and/or without restricting access to the electronic device during charging. Implementations also may provide such a device that is less prone to being forgotten or misplaced by a user due to the arrangement required to charge the device. Additional features, advantages, and implementations of the disclosed subject matter may be set forth or apparent from consideration of the following detailed description, drawings, and claims. Moreover, it is to be understood that both the foregoing summary and the following detailed description include examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

An electronic device configured to receive a charge without connecting to an external charging connector may be beneficial as it may allow for easier access to the electronic device and may not require a user to carry an external charging connector. Additionally, an electronic device configured to charge during the regular operation of a computing device may be beneficial as the electronic device can be charged in a seamless manner without a user deviating from his or her regular behavior. The electronic device may be wearable and may be charged while a user uses a computing device so long as the electronic device is within a certain proximity to at least an area of the computing device. The proximity required to charge the electronic device may correspond to a proximity generally established during regular use of the computing device. For example, a user typing on a keyboard may typically position her wrist between 1 and 3 inches from the base of the keyboard. The base of the keyboard may contain induction coils configured to charge a charging device within 3 inches from the base of the keyboard. A charging device may be a watch, secured to the user's wrist, configured to receive a charge from the induction coils in the base of the keyboard. Accordingly, the watch may receive a charge when the user uses the keyboard in the typical manner.

According to an implementation of the disclosed subject matter, a battery inside the wearable device may be configured to charge via induction. The inductive device battery may charge via an electromagnetic field generated from inductively coupling the inductive device battery to a second inductive device. Induction coils within the inductive device battery and/or the second device may be used to create an alternating electromagnetic field, resulting in charging the inductive device battery. More specifically, a second device may contain an induction coil that creates an electromagnetic field such that when an electronic device is proximate to the second device, one or more device induction coils may convert the power generated by the electromagnetic field to an electrical current and the electrical current may be used to charge the battery. Notably, an electronic device battery may be charged wirelessly via induction, thus eliminating the need to physically connect the electronic device to an external charging connector. Additionally, wirelessly charging a device battery may reduce risk from electrical shocks and exposure to potentially large amounts of power from an outlet such as a wall outlet.

Figure 9A:
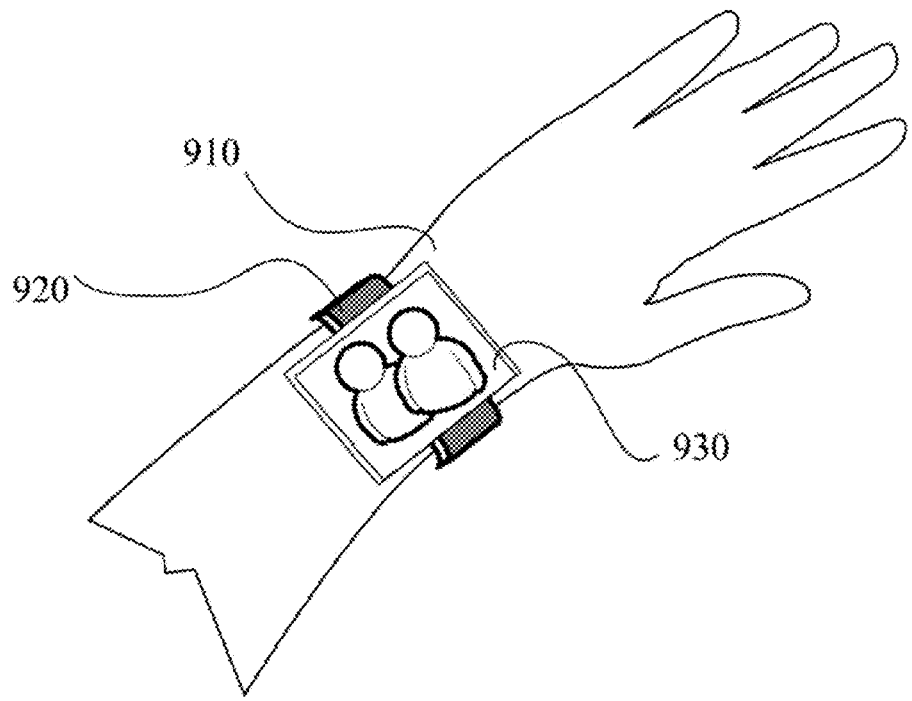
FIG. 9a shows an example visualization for a wrist wearable device according to an implementation of the disclosed subject matter.
Figure 9B:
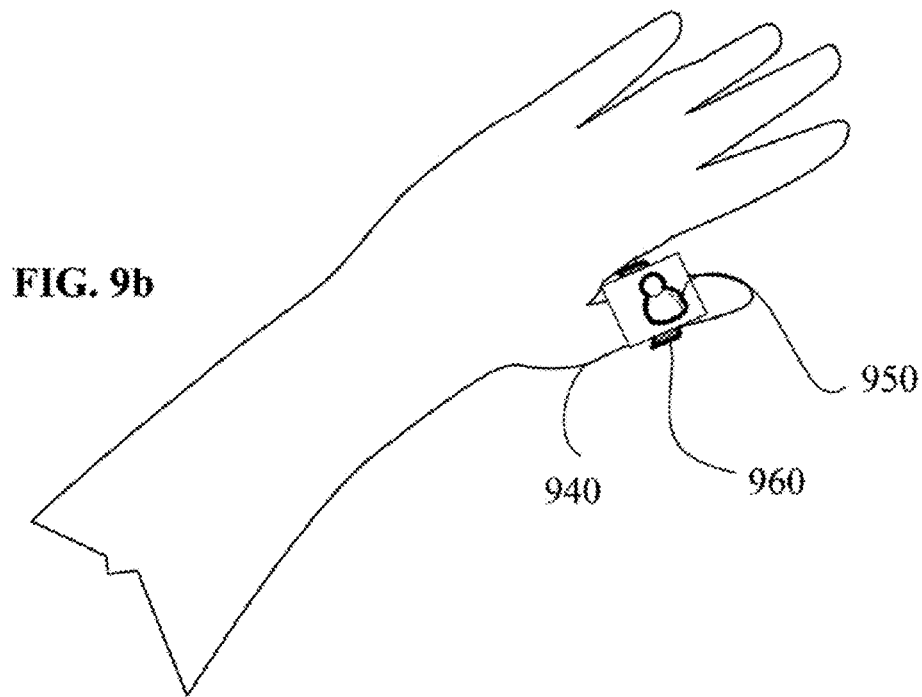
FIG. 9b shows an example visualization for a thumb wearable device according to an implementation of the disclosed subject matter.

According to an implementation of the disclosed subject matter, an electronic device may contain a battery. The battery may reside within the frame of the wearable electronic device or may reside inside a component that secures the fame to a body. As an example, the electronic device may be a wrist-worn computing device and may be secured to a user's wrist using a wrist band as shown in FIG. 9a. A wearable display 930 may be secured to a user's wrist 910 using a wrist band 920. A battery may be contained inside the wearable display 930 or may be contained inside the wrist band 920. Alternatively, a portion of a battery may be contained within an electronic device and another portion of the battery within a component that secures the device. Continuing the example, a portion of the battery may be contained within the wearable display 930 and a portion may be contained within the wrist band 920. As another example, as shown in FIG. 9b, a wearable display 950 may be secured to a user's thumb 940 using a thumb band 960. Accordingly, a battery may be contained inside the wearable display 950, inside the thumb band 960 or inside both the wearable display 950 and thumb band 960.

An electronic device containing a battery may be inductively charged according to the techniques disclosed herein. According to an implementation of the disclosed subject matter, a wearable electronic device may inductively receive a charge during regular operation of a computer device such that the user need not modify the manner of regularly operating the computing device to charge the electronic device. Modifying a manner of regularly operating a computing device may include twisting or turning a body part in an irregular way while using a computing device, placing a body part on or near a portion of the computing device where the body part is not generally placed, moving a body part in a way not normally required to operate the computing device, holding the computing device in an irregular manner, using a computing device at an irregular location, or the like. For example, a keyboard may regularly be used by placing at least a part of both of a user's hands on or above a lower base of the keyboard. Accordingly, techniques disclosed herein may allow a user to continue regular use of the keyboard and induce a charge into a wearable electronic device such that the charge is induced while a user uses the keyboard by placing at least a part of both hands on or above the lower base of the keyboard. The electronic device may continue to charge as a user deviates from regular operation of the electronic device, as using a computer device in a regular manner may not be required to obtain a charge. However, notably, a charge may be induced into an electronic device at least when a computer device is used in a regular manner. The computer device may be any applicable device used regularly by users such as, but not limited to, a desktop, a laptop, a tablet, a mouse, a trackball device, a phone, a remote, an electric steering wheel, an electric gear shift, or the like and may contain a digital interface, a touch screen, a speaker, a 3D display, or the like.

According to an implementation of the disclosed subject matter, an electronic device may be inductively charged by a charging device when the electronic device is within the proximate zone of the charging device. The proximate zone may be a distance between the two devices such that the charging device is capable of inducing a current into the electronic device and charging a battery within the electronic device while the devices are within the proximate zone. The proximate zone may be determined based on physical limitations such that the zone is as wide as the distance within which a charging device can induce a charge into an electronic device. For example, if a charging device is capable of inducing a charge onto an electronic device while the electronic device is within a four inch radius from any part of the charging device, then the proximate zone may be any point within four inches from any part of the charging device. Alternatively, a proximate zone may be the distance between an electronic device and a charging device such that the second charging device is able to induce a threshold level of charge into the electronic device. The threshold level of charge may be based on a predetermined charging property such as an optimal charge level, an efficient charge amount, a safe charge amount, or the like. The threshold level may be predetermined or may be modified dynamically by either the charging device or the electronic device such that either the charging device refrains for inducing a charge or the electronic device rejects a charge until the threshold value is reached. For example, a predetermined threshold may be 2 Watts such that no charge is induced by a charging device into an electric device unless that resulting power from the charge is at least 2 Watts. Accordingly, a proximate zone based on this example may be a distance within which at least 2 Watts of power are received by the electronic device. Alternatively or in addition, the device may be continuously charged while the device is in the proximate zone, and circuitry or logic within the device may manage the charge provided so as not to overcharge the battery, and/or to provide continuous power to the device while the charge is available.

According to an implementation of the disclosed subject matter, the electronic device and/or the charging device may be validated before a charge is induced. The electronic device may validate the charging device for any applicable reason such as, for example, to restrict unintended charging such as to prevent undesired use of power to charge unauthorized devices, to restrict charging via trusted charging sources, to refrain from draining charge from a non-intended charging device, or the like. The validation may be conducted via any applicable communication between the electric device and the charging device such as, but not limited to, Bluetooth communication, scanning an image or a code, infrared communication, via a radio-frequency (RF) signal, or the like.

For example, a wrist wearable watch may be configured to receive a charge wirelessly as disclosed herein when it is within the proximate zone of a charging computer keyboard. The wrist wearable watch may receive identification information from the charging computer keyboard via a RF signal and may reject the charging computer keyboard based on the identification system. As a specific example, a wrist watch may contain an approved list of trusted charging devices from which it is authorized to receive a charge. The wrist watch may enter a proximate zone of an unauthorized keyboard and receive a keyboard serial number via a RF signal received from the keyboard. The wrist watch may compare the keyboard serial number with serial numbers contained in the approved list and may reject a charge from the keyboard based on the lack of a serial number match. A charging device may validate an electronic device for any applicable reason such as, for example, to restrict unintended charging, to restrict drawing unauthorized current form a power source such as a battery, to restrict charging only certain devices based on available power, or the like. For example, a charging device may be configured generally to charge any electronic device within a proximate zone. The charging device may further be configured to limit charging to pre-authorized devices when the charge available in the charging device battery is at a predetermined threshold, for example when the charging device is operating on separately-provided battery power with a limited charge available. For example, if a device within a charging device's proximate zone is determined to be unauthorized based on a look-up table and a Bluetooth connection established between the device and the charging device when the available power is below the predetermined threshold, the charging device may not induce a charge in the device.

According to an implementation of the disclosed subject matter, an electronic device may contain a display and a band to secure the electronic device to a user's body. An end of the band may connect to another end of the band such that a continuous loop is made including the band and the display. The electronic device may be configured such that a charging circuit is closed when the two ends of the band are connected. As an example, a wrist wearable watch may contain a display and a band configured to go around a user's wrist to secure the watch on the wrist. The device and band may be configured to establish a charging circuit only when the band is connected, such as when the band secures the watch around a user's wrist. The charging circuit may be open when the two ends of the band are not connected, and the electronic device may be configured to receive a charge only when the charging circuit is closed. For example, a wrist watch may be configured to charge only when the wrist band is connected, most likely when a user is wearing the wrist watch. Such a configuration may allow for charging to take place only when the device to be charged is actually worn or otherwise in use by the user, for example to prevent unintended charging if the user should remove the device while operating the charging device.

According to an implementation of the disclosed subject matter, a charging device may draw power from a power source to induce a charge into an electronic device. The power source may be any applicable power source such as, but not limited to a power outlet, an internal battery, a peripheral battery, a secondary device connected to a power source, or the like. For example, a keyboard charging device may be connected to a desktop tower, and the tower may be connected to a power outlet. The keyboard charging device may be connected to the desktop tower by a USB or similar cable capable of transferring power from the tower to the keyboard charging device. Accordingly, the keyboard charging device may draw power from the desktop tower as it induces a charge into an electronic device. The charging device may be limited by the amount of charge available via the power source such that the charging device may not provide charge to an electronic device if the power source does not power the charging device, or if the power source has a limited amount of power remaining. For example, a laptop keyboard charging device may draw charge from a laptop battery and may stop providing a charge to an electronic device if the laptop battery runs out of power. Alternatively or in addition, the charging device may be configured such that the charging device stops providing a charge if the battery power level is below a previously determined threshold. The previously determined threshold may be a percentage of battery power, an amount of battery power, an estimated time, or the like, and may be predetermined and/or adjustable by a user. For example, a laptop keyboard charging device with a threshold of 40% may draw charge from a laptop battery and may stop providing a charge to an electronic device if the laptop battery reaches an available charge of 40% or under.

According to an implementation of the disclosed subject matter, an electronic device and/or a charging device may contain an indicator that provides charge values. The indicator may allow a user to remain informed regarding charging activity without having to access a separate battery charge interface on the charging or electronic device. The indicator may be any applicable indicator such as, but not limited to, a light, a sound emitting speaker, a vibrating component, a percentage display, a graphic display, or the like. An indicator located on an electronic device may provide information regarding the amount of charge remaining in the electronic device and/or whether the device is being charged and/or the validation status of a device (e.g., validated to receive a charge, invalidated, etc.). For example, a LED light on a wearable wrist watch may turn green when fully charged, blue while charging, and may be off while not charging. An indicator located on a charging device may provide information regarding the amount of charge remaining on one or more electronic devices and, additionally, may provide identification information regarding one or more electronic devices being charged. For example, a desktop keyboard charger may contain a display which shows a picture of each device that is being charged by the charger. A percentage bar may be juxtaposed next to the picture of each device being charged and may indicate the amount of charge available to each respective device.

Figure 3:
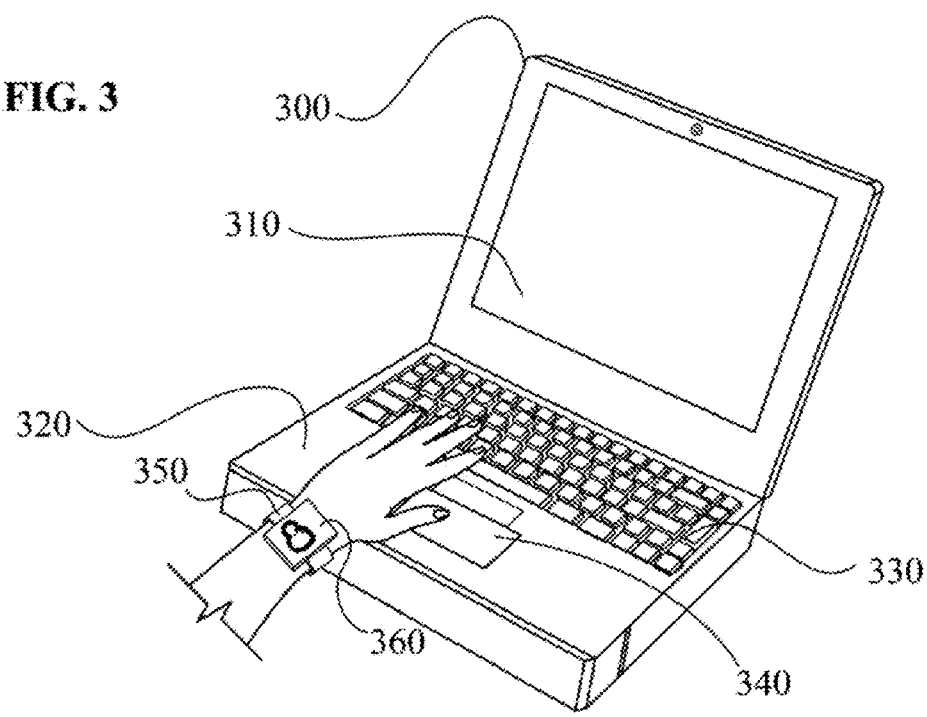
FIG. 3 shows an example visualization for a wearable device configured to charge using a laptop according to an implementation of the disclosed subject matter.

In an illustrative example of the disclosed subject matter, a wrist wearable device may be charged while a user uses a laptop computer in a regular manner. As shown in FIG. 3, a user may use a laptop 300, which includes a screen 310, a laptop keyboard area 330, a laptop wrist area 320 and a laptop touch pad 340. The laptop keyboard area 330 and/or laptop touch pad 340 may be regularly used such that a user's wrist is within a proximate zone of the laptop wrist area. The proximate zone may be an area within 3 inches of any part of the laptop wrist area 320. A wrist wearable device with a display 360 secured by band 350 may be worn by a user using the laptop 300. The laptop wrist area 320 may contain inductive coils capable of providing a charge to the wrist wearable device when it is within the proximate zone. The wrist wearable device may be capable of receiving an inductive charge while within the proximate zone.

Figure 4:
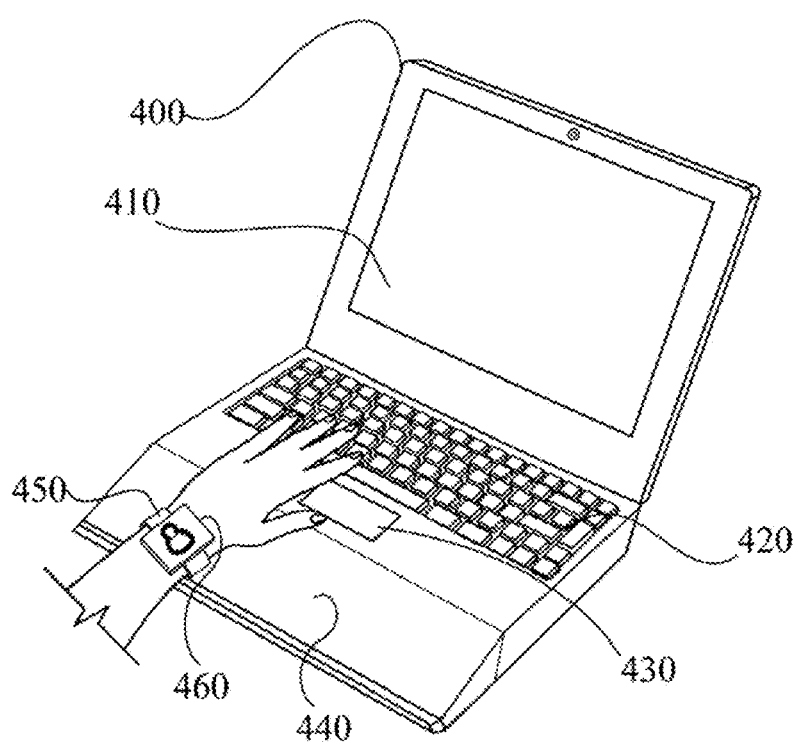
FIG. 4 shows an example visualization for a wearable device configured to charge using a wrist rest area connected to a laptop according to an implementation of the disclosed subject matter.

FIG. 4 shows another illustrative example of the disclosed subject matter which includes a laptop 400 with a screen 410, keyboard 420, touchpad 430, and a wrist support add-on 440. The wrist support add-on 440 may be detachable from the laptop and may contain inductive coils capable of providing a charge to an electronic device within the proximate zone of the wrist support add-on 440. A user may use the laptop 400 while wearing a device as disclosed herein, such as a wrist watch that includes a display 460 secured by a band 450. The proximate zone may be an area within 4 inches of any part of the wrist support add-on 440, so that the wrist watch may be inductively charged when a user regularly uses the laptop 400. Notably, as illustrated by both FIG. 3 and FIG. 4, a user may use a charging device such as a laptop 300 or 400 without deviating from regular laptop use, while the wrist watch worn by the user is inductively charged.

Figure 5:
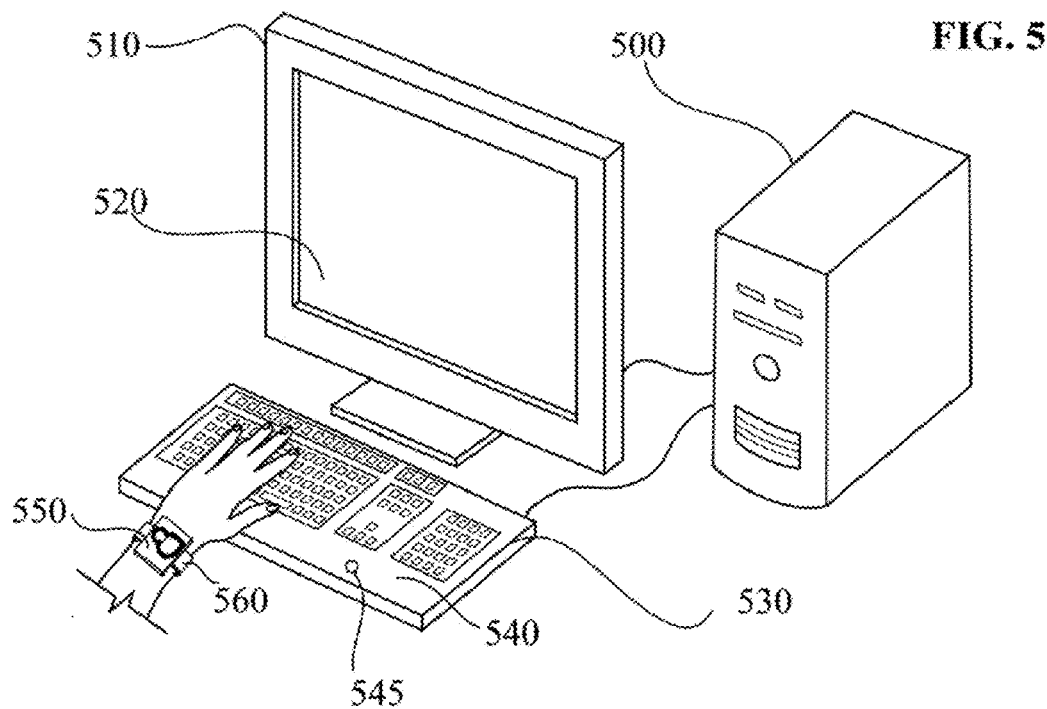
FIG. 5 shows an example visualization for a wearable device configured to charge using a desktop keyboard according to an implementation of the disclosed subject matter.
Figure 6:
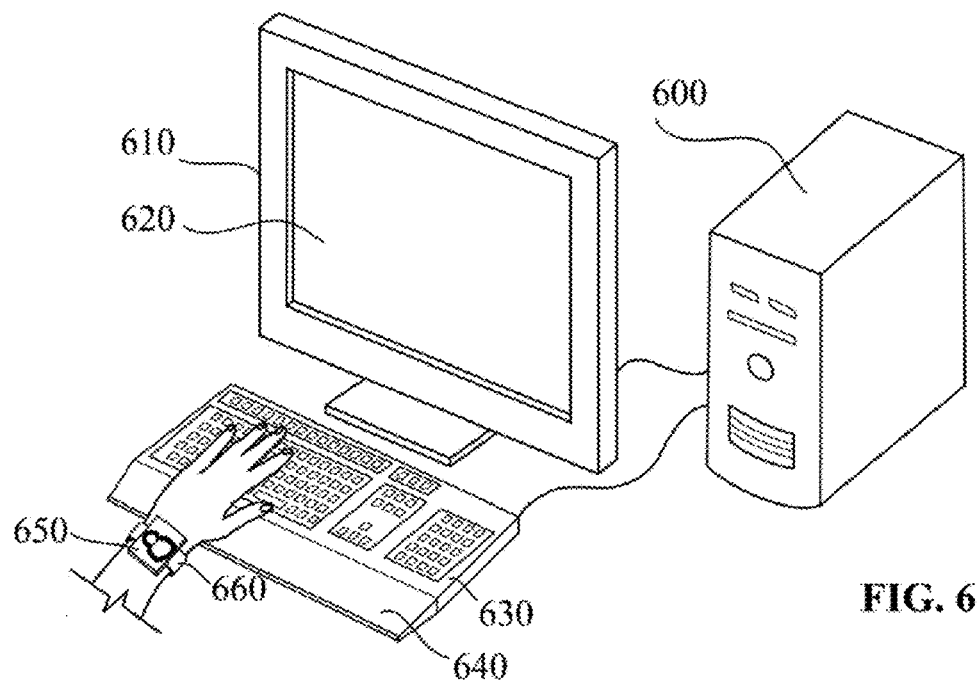
FIG. 6 shows an example visualization for a wearable device configured to charge using a wrist rest area connected to a desktop according to an implementation of the disclosed subject matter.

In an illustrative example of the disclosed subject matter, a wrist wearable device may be charged while a user uses a desktop computer in a regular manner. As shown in FIG. 5, a user may use a desktop computer 500, which is attached to a monitor 510 containing a screen 520, a desktop keyboard 530, and a keyboard wrist area 540. The desktop keyboard 530 may be regularly used such that a user's wrist is within a proximate zone of the desktop keyboard wrist area 540. The proximate zone may be any area such that at least 4 Watts of power are delivered from the desktop keyboard wrist area 540 to an electronic device located within that area. A wearable wrist watch with a display 550 secured by band 560 may be worn by a user using the desktop 500. The desktop keyboard wrist area 540 may contain inductive coils capable of providing a charge to an electronic device when the electronic device is within the proximate zone. The wearable wrist watch may be capable of receiving an inductive charge while within the proximate zone. An indicator 545 may be located on the desktop keyboard 530 and may turn red when an electronic device is being charged by the desktop wrist area 540 and green when an electronic device is within the proximate zone and fully charged. FIG. 6 shows a desktop 600 connected to a monitor 610 containing a screen 610, and a desktop keyboard 630 connected to a wrist support add-on 640. Similar to the add-on described previously with respect to FIG. 4, the wrist support add-on 640 may be detachable from the desktop keyboard 630 and may contain inductive coils capable of providing a charge to an electronic device within the proximate zone of the wrist support add-on 640. The proximate zone may be any area such that at least 4 Watts of power are delivered from the wrist support add-on 640 to an electronic device located within that area. Accordingly, the wearable wrist watch with a display area 650 and strap 660 may receive a charge from the wrist support add-on 640 when the wrist watch is within a proximity close enough to receive at least 4 Watts from the wrist support add-on 540. Notably, as illustrated by both FIG. 5 and FIG. 6, a user may use the desktop computer 500 or 600 without deviating from regular desktop computer use while a wearable wrist watch worn by the user is inductively charged.

Figure 7:
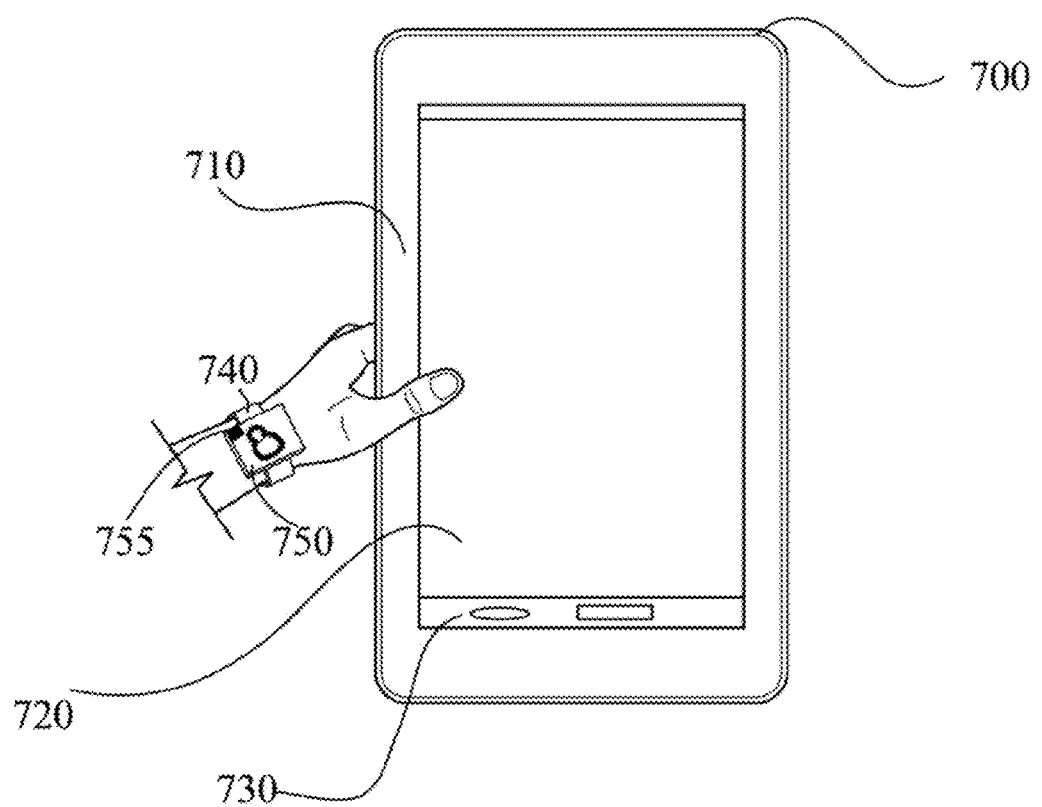
FIG. 7 shows an example visualization for a wearable device configured to charge using a tablet according to an implementation of the disclosed subject matter.

In an illustrative example of the disclosed subject matter, a wrist wearable device may be charged while a user uses a tablet computer in a regular manner. As shown in FIG. 7, a user may use a tablet computer 700 containing a screen 720, a physical button area 730, and a border area 710. The border area 710 may contain one or more induction coils and may inductively charge an electronic device, such as the wrist wearable device with a display area 750 and band 740 as shown in FIG. 7, when the electronic device is within a proximate zone as disclosed herein. The wrist wearable device may contain an indicator 755 that informs a user about a charge value. The indicator 755 may be red when a charge is required, blue while charging, and green when fully charged.

Figure 8:
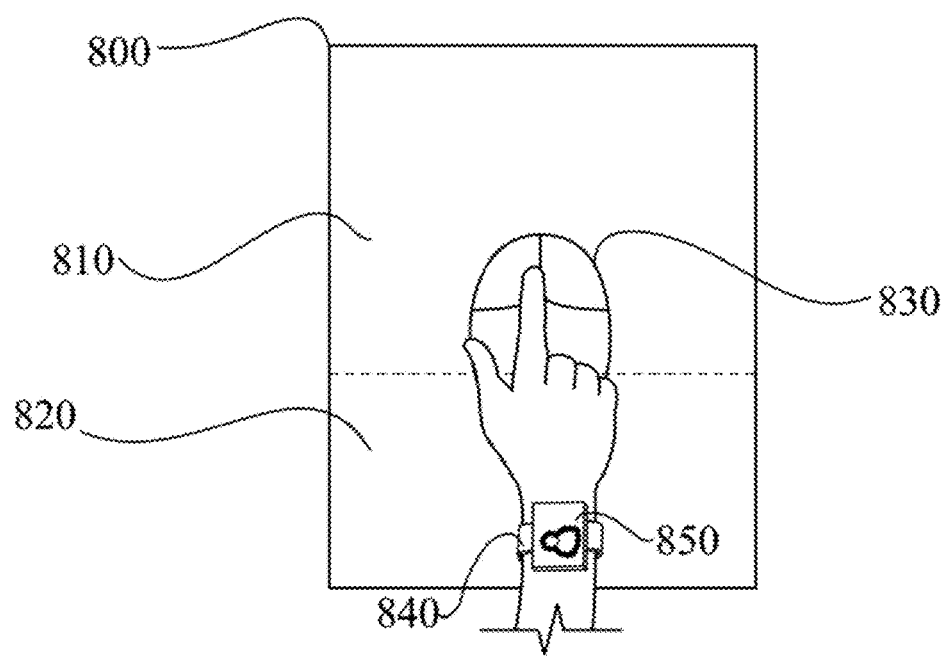
FIG. 8 shows an example visualization for a wearable device configured to charge using a mouse pad according to an implementation of the disclosed subject matter.
Figure 10:
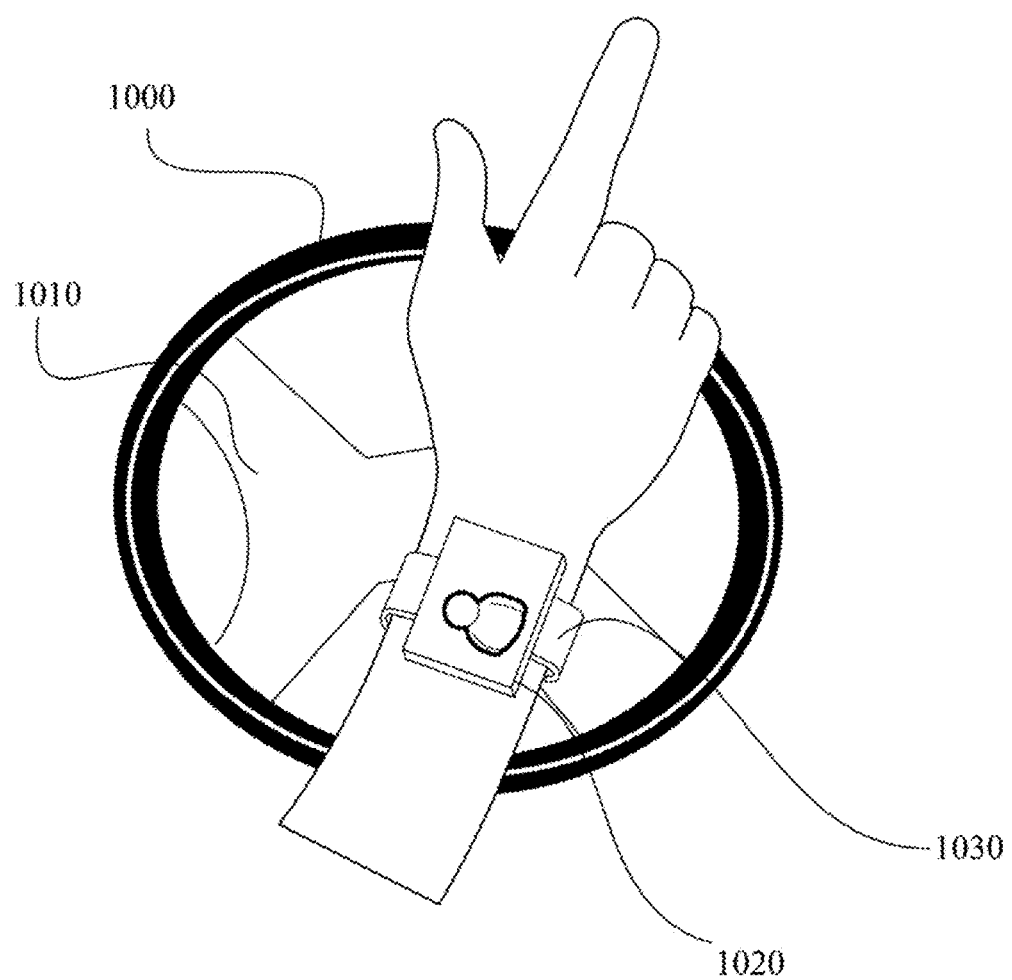
FIG. 10 shows an example visualization for a wearable device configured to charge using a steering wheel according to an implementation of the disclosed subject matter.

In an illustrative example of the disclosed subject matter, a wrist wearable device may be charged while a user uses a mouse pad in a regular manner. As shown in FIG. 8, a user may use mouse pad 800 containing a charging section 820 and a non-charging section 810. The user may operate a mouse 830 in connection with the mouse pad 800. The charging section 820 may contain one or more induction coils and may inductively charge an electronic device, such as the wrist wearable device with a display area 850 and band 840 as shown in FIG. 8, when the electronic device is within a proximate zone as disclosed herein. Similarly, as shown in FIG. 10, a user may use an electric steering wheel 1000 containing a charging section 1010. The user may control a vehicle via the steering wheel in a regular manner as the charging section 1010, containing one or more induction coils, induces a charge into an electronic device, such as the wrist wearable device with a display area 1020 and band 1030 as shown in FIG. 10, when the electronic device is within a proximate zone as disclosed herein.

It will be understood that the specific examples of charging devices disclosed herein are illustrative only and, more generally, any device or component may be configured as a charging device as disclosed. For example, a chair arm; a belt, jacket, or other clothing item; a table or tabletop; sporting equipment; vehicle component; a pen, pencil, or other writing device; a gaming controller, remote control, or other input device; or the like also may be configured as a charging device according to the disclosed subject matter.

Figure 1:
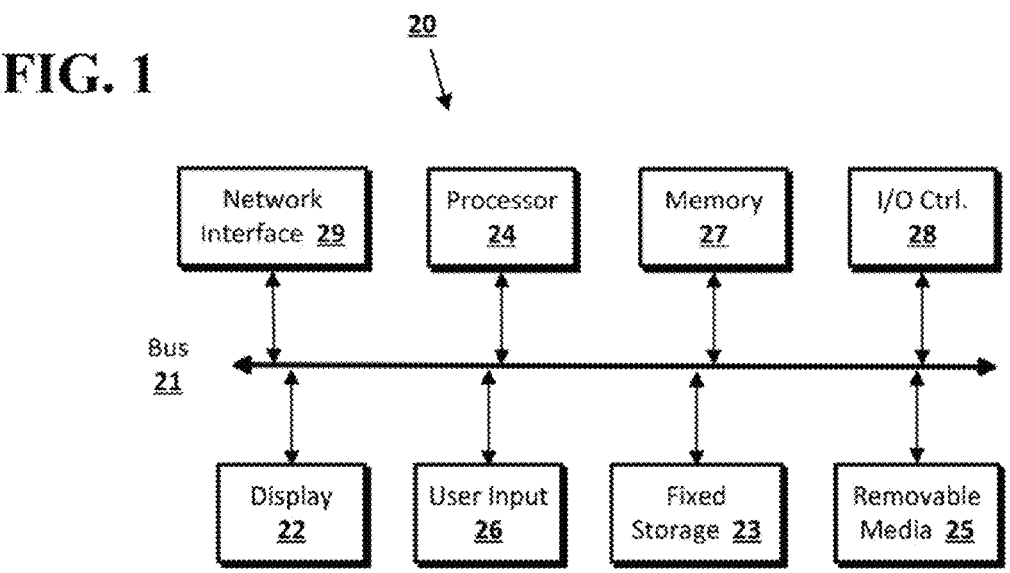
FIG. 1 shows a computer according to an implementation of the disclosed subject matter.

Implementations of the presently disclosed subject matter may be implemented in and used with a variety of component and network architectures. FIG. 1 is an example computer 20 suitable for implementing implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 20 can be stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
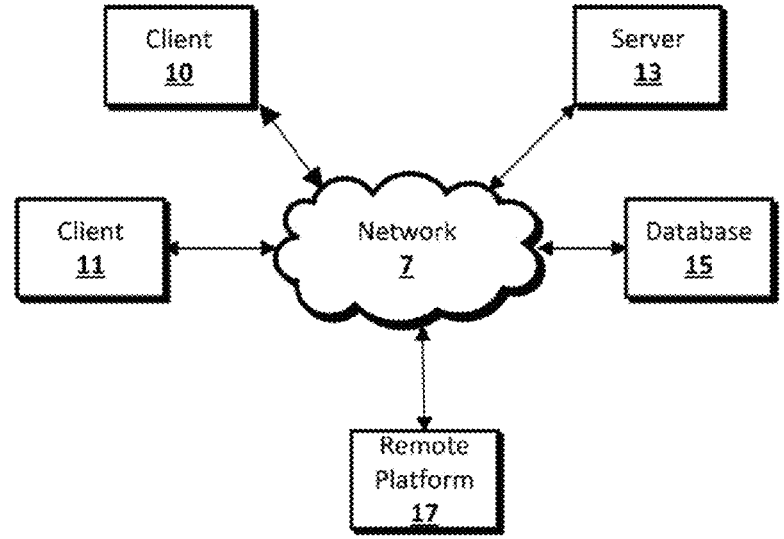
FIG. 2 shows a network configuration according to an implementation of the disclosed subject matter.

FIG. 2 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A device comprising: a wrist wearable display; a band configured to secure the wrist wearable display on a wrist; a battery; a device conductor configured to charge the battery upon receipt of an incident electromagnetic field generated by a peripheral conductor in a computer peripheral device that is inductively coupled to the device conductor; and a processor in communication with the device conductor; and a non-transitory, computer-readable medium in communication with the processor and storing instructions that when executed by the processor, cause the processor to perform operations comprising:
receiving, from the computer peripheral device, an inductor of the computer peripheral device, comparing the indicator of the computer peripheral device to a list of approved indicators, determining based on the comparison that the computer peripheral device is an approved charging device, and
in response to the determination, receiving, at the device conductor from the peripheral conductor, an incident electromagnetic field that induces a charge in the device.

2. The device of claim 1, wherein the wrist wearable display comprises a watch display.

3. The device of claim 1, wherein the wrist wearable display comprises a touchscreen.

4. The device of claim 1, wherein the band contains the battery.

5. The device of claim 1, wherein the wrist wearable display contains the battery.

6. The device of claim 1, wherein a charging circuit for the battery is closed when the band is fastened.

7. The device of claim 1, further comprising an indicator configured to indicate a charge value.

8. The device of claim 1, wherein the indicator is selected from the group consisting of a computer peripheral device identity, a computer peripheral device type, and an available charge amount.

9. A charging device comprising: a regular use area which, when used by a user wearing a wearable device, causes the wearable device to be within a proximate zone of the regular use area; a peripheral conductor configured to generate an electromagnetic field that induces a charge in the wearable device when the wearable device is within the proximate zone;

a processor in communication with the device conductor; and a non-transitory, computer-readable medium in communication with the processor and storing instructions that when executed by the processor, cause the processor to perform operations comprising:
receiving, from the computer peripheral device, an inductor of the computer peripheral device, comparing the indicator of the computer peripheral device to a list of approved indicators, determining based on the comparison that the computer peripheral device is an approved charging device, and
in response to the determination, receiving, at the device conductor from the peripheral conductor, an incident electromagnetic field that induces a charge in the device.

10. The device of claim 9, wherein the charging device is part of a computer peripheral device.

11. The device of claim 10, wherein the computer peripheral device is a wrist support comprising the peripheral conductor.

12. The device of claim 11, wherein the peripheral conductor is configured to charge a battery during regular use of the wrist support.

13. The device of claim 10, wherein the computer peripheral device is a keyboard.

14. The device of claim 13, wherein peripheral conductor is configured to charge a battery during regular use of the keyboard.

15. The device of claim 10, wherein the computer peripheral device is a mouse pad.

16. The device of claim 15, wherein the peripheral conductor is configured to charge a battery during regular use of the mouse pad.

17. The device of claim 9, wherein the regular use area is a wrist rest area for an input device selected from the group consisting of a keyboard, a mouse pad, and a laptop base.

18. The device of claim 9, wherein the regular use area is a portion of a mobile device selected from the group consisting of a tablet, a mobile phone, and a media player.

19. The device of claim 9, wherein the peripheral conductor draws power from a power source.

20. The device of claim 19, wherein the power source is a peripheral device battery.

21. The device of claim 9, wherein the indicator is selected from the group consisting of a wearable device identity, a wearable type, and an available charge amount.

* * * * *